United States Patent
Banoczky et al.

(10) Patent No.: US 6,997,523 B1
(45) Date of Patent: Feb. 14, 2006

(54) BRAKE SYSTEM

(76) Inventors: Bella Banoczky, 1660 Livorna Rd., Alamo, CA (US) 94507; Wayne Trueman, 3748 Hidden Springs, Ct., El Sobrante, CA (US) 94803; Bernard P. Bohunicky, 1353 Canada Rd., Woodside, CA (US) 94062

( * ) Notice: Subject to any disclaimer, the term of this patent is extended or adjusted under 35 U.S.C. 154(b) by 0 days.

(21) Appl. No.: 10/401,017

(22) Filed: Mar. 26, 2003

(51) Int. Cl.
*B60T 17/04* (2006.01)
(52) U.S. Cl. .................................................. 303/87
(58) Field of Classification Search ............... 138/126, 138/130, 131, 30, 31; 303/87; 411/378–426; 188/151 R, 347, 352, 358
See application file for complete search history.

(56) References Cited

U.S. PATENT DOCUMENTS

| | | | |
|---|---|---|---|
| 912,502 A | 2/1909 | Squires | |
| 3,064,687 A | 11/1962 | Natho et al. | |
| 3,430,660 A * | 3/1969 | Mitton | 138/30 |
| 3,757,825 A * | 9/1973 | Givens et al. | 138/26 |
| 3,893,486 A | 7/1975 | Meyers | |
| 4,166,655 A * | 9/1979 | Spero | 303/87 |
| 4,188,073 A | 2/1980 | Ishikawa et al. | |
| 4,220,376 A * | 9/1980 | Spero | 303/87 |
| 4,301,908 A | 11/1981 | Fukuda et al. | |
| 5,078,455 A | 1/1992 | Washington | |
| 5,085,298 A | 2/1992 | Sollami | |
| 5,380,074 A | 1/1995 | Jones | |
| 5,390,989 A | 2/1995 | Kim | |
| 5,468,056 A | 11/1995 | Kim | |
| 5,664,848 A | 9/1997 | Muraski | |
| 5,753,807 A | 5/1998 | Trueman et al. | |
| 5,820,227 A * | 10/1998 | Spero | 303/87 |
| 6,322,160 B1 | 11/2001 | Loh et al. | |
| 6,347,841 B1 * | 2/2002 | Kim | 303/87 |

* cited by examiner

*Primary Examiner*—Christopher P Schwartz
(74) *Attorney, Agent, or Firm*—Bernhard Kreten; Weintraub Genshlea Chediak

(57) ABSTRACT

A fluid damping system for brake fluid disposed in a brake line on a vehicle in which the damping system converts incompressible fluid pulses into damped energy by an accumulator which dissipates the energy to remove the pressure pulses from the fluid system.

8 Claims, 3 Drawing Sheets

BRAKE SYSTEM

FIELD OF THE INVENTION

The following invention relates generally to instumentalities used particularly for stopping the vehicle. More specifically, the instant invention is directed to a hydraulic brake system in which damping in the hydraulic circuit occurs.

BACKGROUND OF THE INVENTION

Hydraulic brake systems are common in the automotive world. The incompressible brake fluid extends from a brake pedal actuated master cylinder to each of the brakes located on the vehicle wheels. The master cylinder and plural slave cylinders are used in conjunction with a fluid containing brake line to distribute the flow of the brake fluid in an appropriate manner to the brakes. In certain situations, brakes can be applied so severely that one or more wheels can lock up.

Although automatic brake systems have been devised which monitor whether one or more wheels have locked up and divert fluid in a rapid fashion away from the locked up brake to ensure maximum braking at times, it is common in vehicles both with and without automatic brake systems (ABS) to induce pressure pulses in the non-compressible brake fluid.

For example, with ABS Systems, severe pressure on the brake pedal can result in a sensation of "chatter" as the valving system diverts brake fluid away from a brake which is being locked. These fluid pulses stress the system. Even in vehicles without ABS, anomalies along the interface between the friction pad and the brake engaging surface can cause fluidic pressure pulses similar to the chatter experienced with ABS.

The following patents reflect the state of the art of which applicants are aware and is included herewith to disclose and discharge applicants' acknowledged duty to disclose relevant prior art. Is respectfully stipulated, however that no single reference anticipates and no combination of references renders obvious the nexus of the instant invention as set forth hereafter.

| U.S. PAT. NO. | ISSUE DATE | INVENTOR |
| --- | --- | --- |
| 912.502 | Feb. 16, 1909 | Squires |
| 3,064,687 | Nov. 20, 1962 | Natho, et al. |
| 3,757,825 | Sep. 11, 1973 | Givens, et al. |
| 3,893,486 | Jul. 8, 1975 | Myers |
| 4,166,655 | Sep. 4, 1979 | Spero |
| 4,188,073 | Feb. 12, 1980 | Ishikaw, et al. |
| 4,220,376 | Sep. 2, 1980 | Spero |
| 4,301,908 | Nov. 24, 1981 | Fukuda, et al. |
| 5,078,455 | Jan. 7, 1992 | Washington |
| 5,085,298 | Feb. 4, 1992 | Sollami |
| 5,380,074 | Jan. 10, 1995 | Jones |
| 5,390,898 | Feb. 21, 1995 | Kim |
| 5,468,056 | Nov. 21, 1995 | Kim |
| 5,664,848 | Sep. 9, 1997 | Muraski |
| 5,753,807 | May 19, 1998 | Trueman, et al. |
| 5,820,227 | Oct. 13, 1998 | Spero |
| 6,322,160 | Nov. 27, 2001 | Loh, et al. |
| 6,347,841 | Feb. 19, 2002 | Kim |

For example, the patents to Spero U.S. Pat. No. 4,220,376 teaches the use of a pressure equalizing devices. In addition, Spero has modified the equalizer in that patent as disclosed in his U.S. Pat. No. 4,166,655. Finally, Spero recognized the limitations in those two patents by developing a further U.S. Pat. No. 5,820,227. Columns 1 and 2 of the '227 patent list some of the frailties in Spero's earlier patents as well as that of the patent to Washington, U.S. Pat. No. 5,078,455.

The remaining patents diverge from the nexus of the instant invention even further.

SUMMARY OF THE INVENTION

The instant invention is distinguished over the known prior art in a multiplicity of ways. For example, a fitting is provided with a through channel, with the fitting provided with an inlet and an outlet that allows easy attachment to a brake line anywhere along the length of the brake line, where it extends typically from the master cylinder to the brake itself. The fitting includes a passage way which receives a housing that accommodates an accumulator. The accumulator functions as an absorber or damper and is disposed within an interior of the housing and is provided with a truncated conical shape. The accumulator is operatively coupled to a accumulator rod having a portion which faces towards the channel, but does not extend therein. The accumulator is guided within the interior of the housing by means of a tapering bevel along one extremity of the housing adjacent a free end of the accumulator to act as a guide. A cavity surrounds a major portion of the accumulator and accommodates distortion of the accumulator in the air space thus provided. A bleed nipple is disposed on a side of the fitting diametrically opposite from the accumulator housing and communicates with the channel by means of a nipple branch.

In use and operation, when the non-compressible brake fluid experiences a pressure pulse, the pressure wave enters into the passageway and exerts a force on the accumulator rod causing compression of the accumulator and distortion of the accumulator within the open cavity which surrounds the accumulator defined by the space between the accumulator and housing. Because there is no air in the brake fluid circuit, the response of a pressure wave is immediate and directed to the accumulator instantaneously which therefore dissipates the pressure wave in an immediate fashion since the accumulator is immediately distended and distorted in the available open cavity air space around the accumulator. Thus, pressure equalization is effected.

OBJECTS OF THE INVENTION

Accordingly, is a primary object of the present invention to provide a new, novel and reliable equalization device for removing pressure pulses in brake systems.

A further object of the present invention is to provide a device as characterized above which is extremely durable in construction, easy to retro fit on existing vehicles and safe to use.

A further object of the present invention is to provide a device as characterized above which lends itself to mass production techniques.

A further object of the present invention is to provide a device which can be deployed substantially anywhere along the length of brake line.

A further object of the present invention is to provide a device as characterized above which can be used on all four brakes of a vehicle.

A further object of the present invention is to provide a device as characterized above which provides instantaneous response to the pressure wave that is sent through the fluid braking system and is immediately resolved.

A further object of the present invention is to provide a device where the brake fluid can be easily bled to remove air from the system.

A further object of the present invention is to provide a device as characterized above which does not in and of itself induce its own turbulence as is common in the prior art.

Viewed from a first vantage point, it is an object of the present invention to provide a hydraulic brake pressure damping system, comprising in combination: a brake actuator operatively coupled to a brake by an interposed line which carries hydraulic fluid there between, and a fitting having an inlet and an outlet connect to said line in fluid communication with the fluid, said fitting formed with a hollow channel between said inlet and outlet and a passageway branching from said channel leading to a fluid pulse accumulator, said accumulator located in a housing having a top piece portion communicating with said fitting at said passageway and a bottom piece portion having an interior hollow which houses said accumulator, and means to maintain a cross-section of said channel completely unobstructed at all times along its entire length.

DESCRIPTION OF PREFERRED EMBODIMENTS

Figure 1:
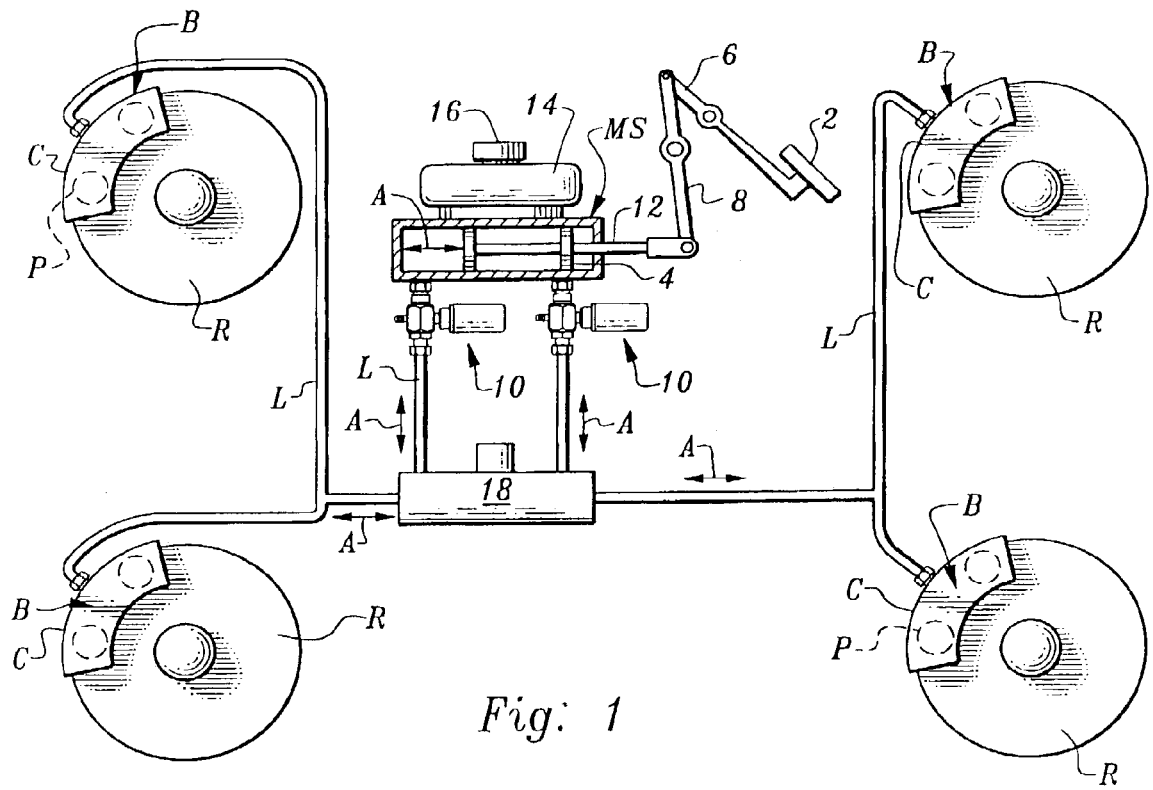
FIG. 1 is a schematic depiction of the apparatus according to the present invention in its deployed condition.

Referring to the drawings, when like numerals relate to like parts, reference numeral 10 is directed to the damping system according to the present invention.

In its essence, the damping system (10) includes a fitting (20) (FIG. 2) having central channel (26) (FIG. 3) which is oriented in fluid communication with the brake fluid by its placement anywhere along the length of a brake line (L) (FIG. 1), but is most efficiently deployed adjacent the master cylinder (MS). The channel (26) includes an interior passageway (50) extending off therefrom that leads to a housing (90) (FIG. 2) within which an accumulator (80) (FIG. 5) is operatively deployed. Because the brake fluid in incompressible, shock waves transmitted through the brake fluid will arrive at the passageway (50) of the damping system (10) and be dissipated by the accumulator (80).

Figure 2:
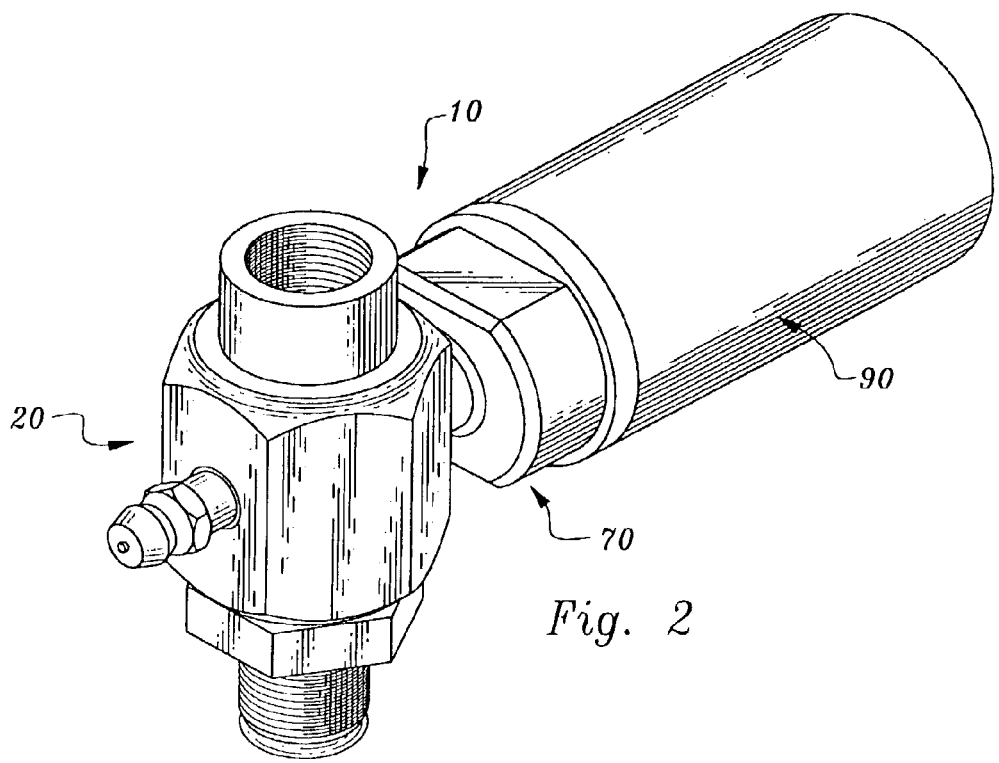
FIG. 2 is a perspective view of the apparatus according to the present invention.

More particularly, and with reference to the drawing FIGS. 1 through 5, the damping system (10) is operatively deployed within the existing braking network of a vehicle as shown in FIG. 1. A brake pedal (2) is operatively coupled to a series of links (6), (8), which lead to a piston shaft (12) that allows reciprocal movement of pistons (4) located within the master cylinder (MS). The brake action initiated at the pedal (2) causes bi-directional movement of the working fluid in the direction of the double ended arrow (A). The master cylinder includes a brake fluid reservoir (14) accessible by a cap (16). The damping system (10) can be deployed anywhere along the length of the brake line (L). The brake line (L) extends from the master cylinder (MS) and travels to each of the wheels that include a rotor (R) at the brake (B).

Calipers (C) receive the free end of the brake line (L) and internal routing (not shown) lead to brake pads (P) so that the pads, under fluidic pressure grab rotors (R) to effect braking. A check valve (18) is deployed in line to control bi-directional flow.

In certain instances, for example with ABS, the ABS modulator valves actuate quickly and at a high frequency in order to prevent wheels from locking up. In other situations, imperfections on the rotor or out of round conventional brake drums will send pressure pulses through the fluid system. When pulsing occurs, the system's efficiency will have been compromised. As a result, the damping system (10), which can be deployed anywhere along the length of the line (L) is fashioned to meet with the traditional coupling that exists between the line (L) and its connection at the master cylinder (MS). By removing that coupling, the damping system (10) mimics the coupling geometry that exists between the master cylinder and brake line.

Figure 3:
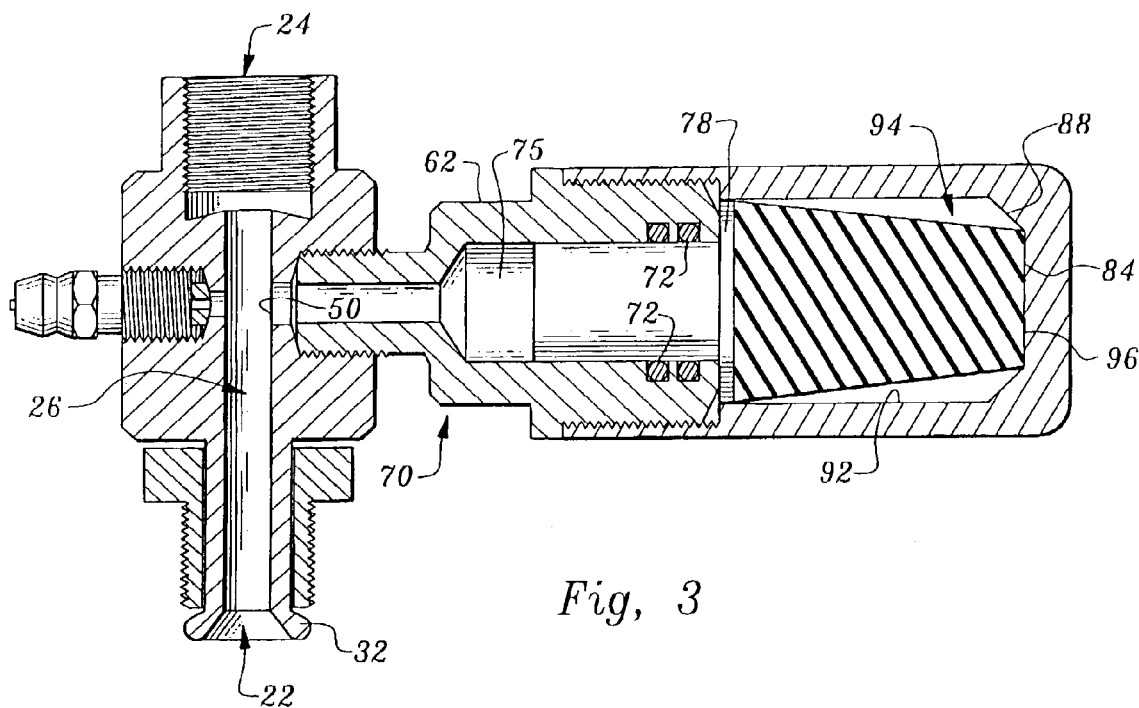
FIG. 3 is a sectional view of the apparatus according to the present invention in its relaxed, "non-pressure pulsed" state.
Figure 5:
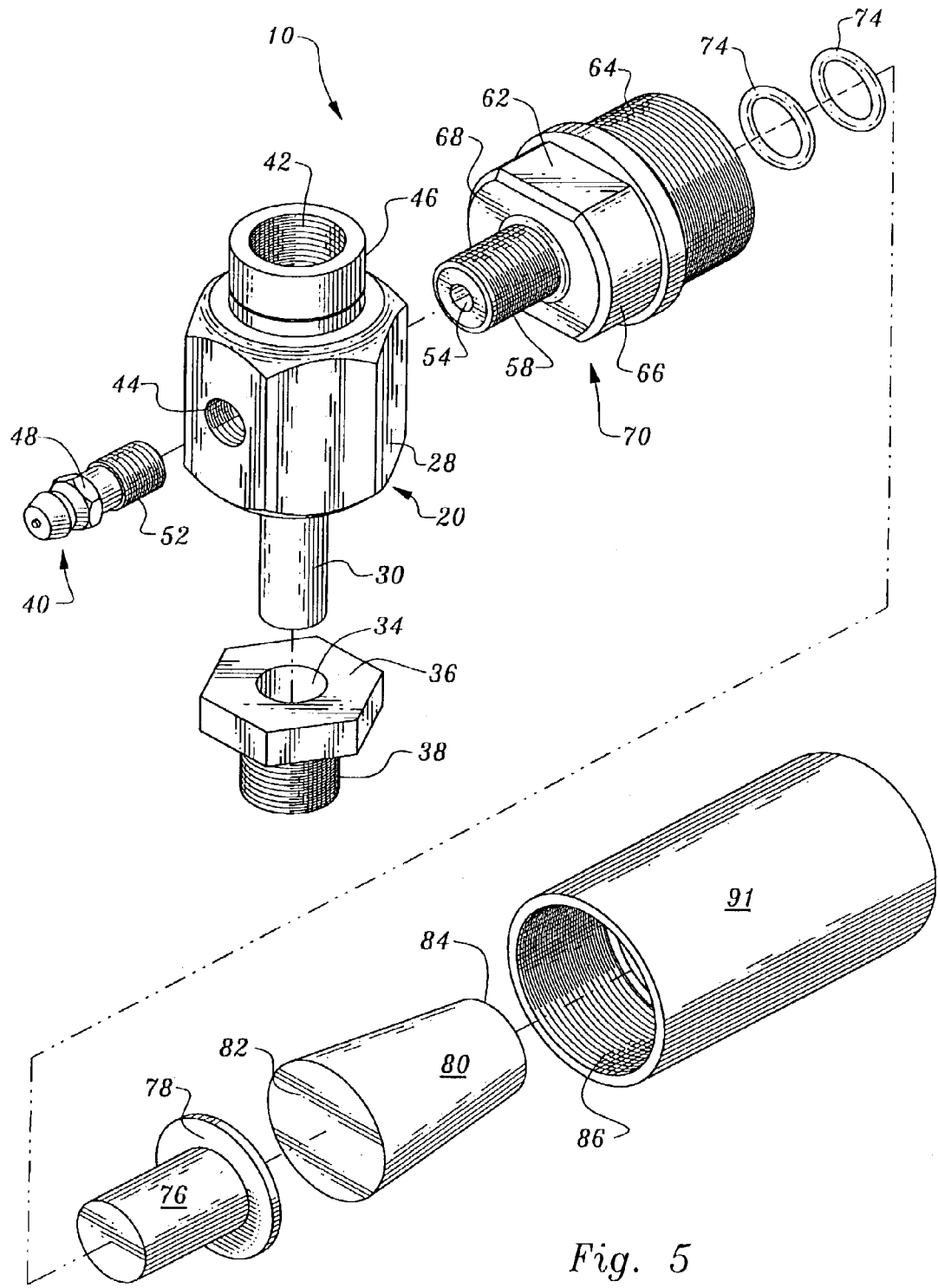
FIG. 5 is an exploded parts view of the apparatus according the present invention.

More specifically, and with reference to FIGS. 3 and 5, fitting (20) (FIG. 2) of the damping assembly (10) includes an inlet (22) (FIG. 3) and an outlet (24) separated from each other on the fitting (20) by means of an unobstructed central channel (26). The fitting (20) has an exterior body formed with a plurality of facets (28) and has a stem (30) (FIG. 5) projecting from one end of the faceted body over which the bore (34) of a connector (38) is deployed. The connector (38) is formed with a plurality of threads at one end and is held on the stem (30) by means of a swage (32) formed on the stem (30). As thus described, the connector threads (38) are free to rotate on the stem (30). A hex nut (36) is integrally formed with the connector threads (38) so that the threads can be advanced into an interior bore of the master cylinder without turning fitting (20).

In addition, an opposite end of the channel (26) (FIG. 3) includes interior threads (42) (FIG. 5) which are dimensioned to receive the threads of the brake line (L). Thus, the instant invention can be plumbed into the brake system with a minimum amount of modifications to the brake system of an existing vehicle.

Figure 4:
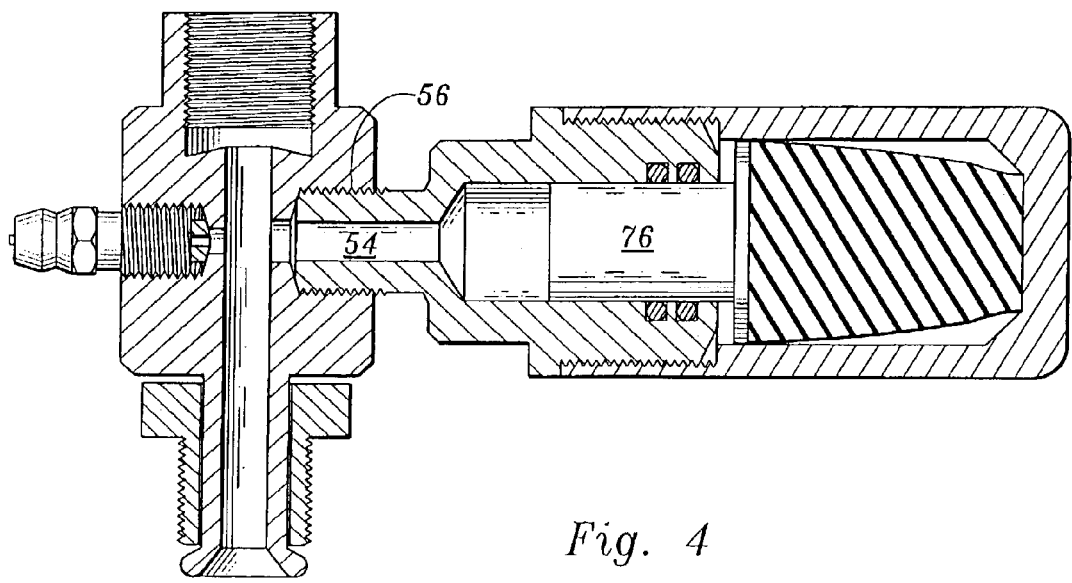
FIG. 4 is a sectional view similar to FIG. 3 showing the reaction of the system in response to a pressure wave.

The channel (26) of the fitting (20) communicates with a passageway (50) extending perpendicularly from the channel (26). The passageway (50) includes a threaded interior bore (56) (FIG. 4) dimensioned to receive threads (58) (FIG. 5) of a top piece upper portion (70) along its right hand side of FIG. 3 of a housing (90). The top piece (70) includes a central interior bore (54) (FIG. 4) with respect to threads (58) (FIG. 5). The interior bore (54) leads to a cylinder (75) (FIG. 3) which receives an accumulator rod (76) (FIG. 4) formed of generally cylindrical configuration and reciprocally disposed within the cylinder (75) (FIG. 3) and which is in fluid communication with the passageway (54) (FIG. 4). The accumulator rod (76) (FIG. 4) also includes at an end thereof remote from the channel (26) (FIG. 3) a disc portion (78) integrally formed with the cylindrical rod (76) (FIG. 4). The disc portion (78) serves as a stop against the upper portion (70) (FIG. 3) along its right hand side of FIG. 3. A periphery of the cylindrical rod (76) (FIG. 4) is girded by a pair of "O" rings (74) (FIG. 5) imbedded within the interior cylinder walls (75) (FIG. 3) of the upper portion (70). An exterior of the upper portion (70) includes a pair of opposed flat surfaces (62) (FIG. 3) dimensioned to receive a wrench thereon for advancement of the threads (58) in and out of the threaded interior bore (56). A plurality of further threads (64) are located on the upper portion (70) dimensioned to mesh with threads (86) located on an interior hollow (94) of bottom piece lower portion (91) of the housing (90). The bottom piece (91) interior hollow (94) is cylindrical (92)

adjacent its juncture with the disc portion (78) and its dimension is substantially equal to the radius of the disc portion (78) of accumulator rod (76). An end wall (96) of the bottom piece (91) remote from the disc (78) seals the housing (90). A transition (88) exists between the interior bore (92) and the end wall (96) which is chamfered (88) so that an accumulator (80) placed within the lower portion will always be centered within the interior.

The accumulator (80) (FIG. 5) is essentially a frusto conical element having a base (82) which addresses the disc (78) and is substantially of the same radius, and an end (84) parallel to and remote from the base (82) has a radius substantially the same as the end wall (96). The chamfer (88) assures that the truncated cone shaped accumulator (80) is self centering because the bevel or chamfer (88) urges the accumulator (80) to remain symmetric to the long axis of the housing.

A gap (94) exists between accumulator (80) and the hollow defined by cylinder (92) for the inclusion of air in the free space gap (94). The pair of "O" rings (74) installed in grooves (72) of interior walls of upper portion (62) that circumscribe the accumulator rod (76) assures that no brake fluid will enter into the free space gap (94) (FIG. 3). Thus, only air which had been provided during assembly is present in the gap (94).

A further threaded bore (44) (FIG. 5) is provided in opposition to the passageway (50). A nipple (40) having a thread (52) complemental to the thread (44) is received within thread (44) and the nipple (40) includes a wrench receiving facet (48) for rotation during installation and bleeding. The nipple (40) allows the system to be purged of air within the fluidic line (L) and channel (26).

Once the system has been plumbed into the existing brake line, and after the air has been bled from the brake line (L) and passageway (50) and channel (26), the system will operate as shown in FIGS. 3 and 4. When a fluidic pressure pulse in experienced in the incompressible brake fluid, the accumulator rod (76) will move from the FIG. 3 position to the FIG. 4 position. This causes the accumulator (80) to distort and occupy more of the available free space gap (94) by the distortion of the accumulator within that hollow area.

Moreover, having thus described the invention, it should be apparent that numerous structural modification may be resorted to without departing from the scope and fair meaning of the instant invention as set forth here and above and defined here and below by the claims.

I claim:

1. A hydraulic brake pressure damping system, comprising in combination: a brake actuator operatively coupled to a brake by an interposed line which carries hydraulic fluid there between, and a fitting having an inlet and an outlet connect to said line in fluid communication with the fluid, said fitting formed with a hollow channel between said inlet and outlet and a passageway branching from said channel leading to a fluid pulse accumulator, and said accumulator located in a housing having a top piece portion communicating with said fitting at said passageway and a bottom piece portion having an interior hollow which houses said accumulator, and means to maintain a cross-section of said channel completely unobstructed at all times along its entire length; and
    wherein said fitting includes a threaded connector attached to a master cylinder, said connector rotatably mounted on a stem of said fitting and held there by a swage at a free end of said stem, whereby said system is installed with mere rotation of the connector and not said fitting.

2. The system of claim 1 wherein said passageway receives a rod having a disc portion which abuts against said accumulator.

3. The system of claim 2 wherein said accumulator has a small end which abuts said end wall, surrounded by said a chamfer.

4. The system of claim 1 wherein said bottom piece portion includes a chamfer adjacent an end wall, said accumulator being centered in said interior hollow and held centered by said chamfer.

5. The system of claim 1 wherein said accumulator is substantially frusto-conical and resides within an interior of a housing, said interior having an end wall which is chamfered so as to center said accumulator.

6. A hydraulic brake pressure damping system, comprising in combination: a brake actuator operatively coupled to a brake by an interposed line which carries hydraulic fluid there between, and a fitting having an inlet and an outlet connect to said line in fluid communication with the fluid, said fitting formed with a hollow channel between said inlet and outlet and a passageway branching from said channel leading to a fluid pulse accumulator, said accumulator serving as an energy absorber and located in a housing having a top piece portion communicating with said fitting at said passageway and a bottom piece portion having an interior hollow which houses said accumulator, said top piece having a hollow interior into which said fluid acts on a reciprocating cylindrical rod, said rod having peripheral seals prohibiting said fluid therebeyond, said rod having a disc of greater cross-section and overlying said accumulator and means to maintain a cross-section of said channel completely unobstructed such that a uniform cross section exits unencumbered by impediments along the length of said channel at all times along its entire length wherein said fitting includes a threaded connector attached to a master cylinder, said connector rotatably mounted on a stem of said fitting and held there by a swage at a fee end of said stem.

7. The system of claim 6 wherein one end of said channel includes interior threads dimensioned to receive threads of the brake line.

8. A hydraulic brake pressure damping system, comprising in combination: a brake actuator operatively coupled to a brake by an interposed line which carries hydraulic fluid there between, and a fitting having an inlet and an outlet connect to said line in fluid communication with the fluid, said fitting formed with a hollow channel between said inlet and outlet and a passageway branching from said channel leading to a fluid pulse accumulator, and said accumulator having a truncated, conical shape tapering away from said channel defining a small end and said accumulator located in a housing having a top piece portion communicating with said fitting at said passageway and a bottom piece portion having an interior hollow which houses said accumulator, and means to maintain a cross section of said channel completely unobstructed at all times along its entire length; and
    wherein said bottom piece portion includes a chamfer adjacent an end interior wall, said accumulator being centered in said interior hollow and held centered by said chamfer abutting against a periphery of said small end of said accumulator.

* * * * *